(12) United States Patent
Walsh et al.

(10) Patent No.: US 6,886,107 B2
(45) Date of Patent: Apr. 26, 2005

(54) METHOD AND SYSTEM FOR SELECTING A MASTER CONTROLLER IN A REDUNDANT CONTROL PLANE HAVING PLURAL CONTROLLERS

(75) Inventors: Robert J. Walsh, Ashland, MA (US); Steve N. Barbas, Billerica, MA (US); James F. Friend, Pepperell, MA (US)

(73) Assignee: Marconi Intellectual Property (Ringfence), Inc., Warrendale, PA (US)

(*) Notice: Subject to any disclaimer, the term of this patent is extended or adjusted under 35 U.S.C. 154(b) by 585 days.

(21) Appl. No.: 09/999,156

(22) Filed: Nov. 15, 2001

(65) Prior Publication Data

US 2002/0099972 A1 Jul. 25, 2002

Related U.S. Application Data

(60) Provisional application No. 60/264,094, filed on Jan. 25, 2001.

(51) Int. Cl.⁷ .................................................. G06F 11/00
(52) U.S. Cl. ........................................................ 714/4
(58) Field of Search .................................. 714/4, 10, 11

(56) References Cited

U.S. PATENT DOCUMENTS 6,542,924 B1 * 4/2003 Abe ........................... 709/208
6,587,961 B1 * 7/2003 Garnett et al. ................. 714/11

* cited by examiner

*Primary Examiner*—Nadeem Iqbal
*Assistant Examiner*—Timothy M. Bonura
(74) *Attorney, Agent, or Firm*—Ansel M. Schwartz

(57) ABSTRACT

A system and method for configuring a control plane within a network device. One of a pair of control processors is selected to act as the master of the control plane and the other control processor is specified as a standby control processor in normal operation. In the case of a failover or switchover event, the standby control processor assumes the role of the master of the control plane and updates configuration information within line cards in the network device as necessary. A state machine within the control processor is employed to manage state transitions for the control processor. Each control processor generates at least one signal that indicates whether it is capable of serving as the master of the control plane. Master selection logic selects one of the control processors as the master for the control plane and in one embodiment advertises the identification of the master control processor via triply redundant signals. Voting logic within the control processors and other cards within the network device is employed to identify the selected master unit for the control plane. The selected master control plane processor forwards the configuration information over control paths that are isolated from the data path within the network device.

25 Claims, 7 Drawing Sheets

|  | Master_A_1 | Master_A_2 | Master_A_3 | Result |
|---|---|---|---|---|
| Error Scenario: Master_A_1 | | | | |
| A is master, no error | 1 | 1 | 1 | A |
| A is master, Master_A_1 stuck high | 1 | 1 | 1 | A |
| A is master, Master_A_1 stuck low | 0 | 1 | 1 | A |
| B is master, no error | 0 | 0 | 0 | B |
| B is master, Master_A_1 stuck high | 1 | 0 | 0 | B |
| B is master, Master_A_1 stuck low | 0 | 0 | 0 | B |
| Error Scenario: Master_A_2 | | | | |
| A is master, no error | 1 | 1 | 1 | A |
| A is master, Master_A_2 stuck high | 1 | 1 | 1 | A |
| A is master, Master_A_2 stuck low | 1 | 0 | 1 | A |
| B is master, no error | 0 | 0 | 0 | B |
| B is master, Master_A_2 stuck high | 0 | 1 | 0 | B |
| B is master, Master_A_2 stuck low | 0 | 0 | 0 | B |
| Error Scenario: Master_A_3 | | | | |
| A is master, no error | 1 | 1 | 1 | A |
| A is master, Master_A_3 stuck high | 1 | 1 | 1 | A |
| A is master, Master_A_3 stuck low | 1 | 0 | 1 | A |
| B is master, no error | 0 | 0 | 0 | B |
| B is master, Master_A_3 stuck high | 0 | 1 | 0 | B |
| B is master, Master_A_3 stuck low | 0 | 0 | 0 | B |

*Fig. 6*

METHOD AND SYSTEM FOR SELECTING A MASTER CONTROLLER IN A REDUNDANT CONTROL PLANE HAVING PLURAL CONTROLLERS

CROSS REFERENCE TO RELATED APPLICATIONS

This application claims priority of U.S. Provisional Patent Application No. 60/264,094 filed Jan. 25, 2001 and titled Selection of a Primary Controller in a System with Redundant Controllers.

STATEMENT REGARDING FEDERALLY SPONSORED RESEARCH OR DEVELOPMENT

N/A

BACKGROUND OF THE INVENTION

The present invention relates to a high availability network device and more specifically to a system and method for selecting and activating a control processor for a control plane in a network device such as switch or router.

In recent years telecommunications and data networks have become pervasive in industry and commerce. In a telecommunications or data network, information is conveyed from one user or application to another user or application through the network via a series of interconnected network switches or routers. Forwarding tables stored within each switch or router determine the output port to which received traffic should be forwarded. The forwarding tables also contain packet header modification data.

Typically, network devices include line cards that have input and output ports coupled to communication links. The line cards are also typically coupled to a switch fabric. Data units received at an input port are forwarded to the switch fabric and to at least one output port of at least one line card for forwarding over the corresponding communication link.

There is an ongoing need during the operation of a network device to update the forwarding tables and otherwise convey control and configuration information to line cards that are responsible for data forwarding. Typically, forwarding tables are updated "inband" with the payload data being conveyed by the network device. The transmission of forwarding tables, control and configuration information inband undesirably occupies bandwidth that might otherwise be available for data traffic.

Moreover, it is generally important for the network device to have high availability since the failure of a network switch or router can result in the loss of critical data. The loss of the ability to update forwarding tables or otherwise modify the control and configuration information within line cards of the network device typically renders the network device unusable. Additionally, the failure of a component within the control path for a network device can lead to costly unscheduled maintenance.

For these reasons, it would be desirable to have the ability to reliably select a control processor from a pair of redundant control processors for a control plane in a network device.

BRIEF SUMMARY OF THE INVENTION

A system and method for selecting a control processor in a network device having a redundant control plane is disclosed. In a network device having first and second Router Control Processors (RCPs), one of the RCPs serves as the Master RCP and the other RCP serves as a standby RCP in normal operation.

Master selection logic within the network device receives at least one status signal from each of the first and second RCPs. Based upon the received status signals the Master Selection Logic generates at least one identification signal that identifies the RCP that is to serve as the master of the control plane. The at least one identification signal is based upon a predetermined truth table. In one embodiment, if both RCPs are capable of serving as the master of the control plane, that role defaults to a predetermined RCP.

Each of the RCPs and other cards within the network device include a state machine that determines, based upon the received at least one identification signal, whether the respective RCP has been selected as the Master RCP for the control plane. In one embodiment, the at least one selection signal comprises triply redundant signals. Each of the RCPs and other cards within the network device include voting logic that receives the triply redundant selection signals. If at least two of the triply redundant selection signals are of a first state, the first RCP is selected as the Master of the control plane. If at least two of the triply redundant selection signals are of a second stated, the second RCP is selected as the Master of the control plane. The use of triply redundant selection signals assures that a single error in the Master Selection Logic output or the identification signals will not result in an erroneous identification of the Master of the control plane.

The state machine or alternatively, a state controller, controls the hardware failover from one RCP to the other RCP or a switchover that occurs under the control of management software. Additionally, the state machine recognizes other possible states relevant to the failover/switchover from one RCP to the other RCP.

Each RCP asserts a Master_Capable signal if the respective RCP has determined it is capable of serving as the master of the control plane following the execution of a first set of diagnostics. The Master_Capable signal may be asserted if the RCP successfully runs predetermined diagnostics, if the RCP can establish communications with a remote Network Operations Center (NOC), and/or if the RCP can successfully establish inter-RCP communications with the other RCP.

Additionally, each RCP asserts a Watchdog signal periodically to prevent the RCP from timing out. The timeout will occur if the RCP fails predetermined tests performed within the watchdog interval. For example, if the RCP determines that inter-RCP communications have failed, that communication with the NOC is not possible, or that the RCP has failed other predetermined diagnostic tests that are periodically run by the RCP, then the Watchdog signal will not be asserted and a Watchdog Timer will be allowed to time out. Upon the occurrence of a timeout of the Watchdog Timer, a failover occurs to the other RCP in the event that RCP is capable of serving as the Master of the control plane.

Following selection as the Master RCP, the selected RCP updates the forwarding tables for the line cards within the network device and modifies other configuration information as necessary by transferring such information over the control plane to the applicable line card(s).

Other features, aspects and advantages of the presently disclosed system will be apparent from the Drawing and Detailed Description that follows.

BRIEF DESCRIPTION OF THE SEVERAL VIEWS OF THE DRAWING

The invention will be more fully understood by reference to the following Detailed Description in conjunction with the Drawing of which:

FIG. 6 is a table illustrating a master unit selection in the face of error and non-error conditions on triply redundant selection signals.

DETAILED DESCRIPTION

U.S. Provisional Patent Application No. 60/264,094, titled Selection of a Primary Controller in a System with Redundant Controllers and filed Jan. 25, 2001 is incorporated herein by reference.

Consistent with the present invention, a redundant control plane architecture for use in a network device such as a network switch or network router is disclosed. The redundant control plane permits failover or a controlled switchover from a Master or active Router Control Processor (RCP) to a standby RCP in the event of a failure of any single component or bus within the redundant control plane so that the control plane remains functional. The control paths in the presently disclosed redundant control plane are isolated from the data plane of the network device so that control traffic does not utilize data plane bandwidth. The control plane in the presently disclosed system is used as the communication path for downloading forwarding tables to the line cards, for transmittal of control and configuration information to be stored in the line cards and for transmittal of slow path traffic from line cards to a central processing function for handling. Such slow path traffic includes, for example, Internet Protocol (IP) packets sourced by or addressed to a virtual router, IP packets requiring IP Option processing, IP packets requiring IP fragmentation and Layer 2 control protocol communications.

Figure 1:
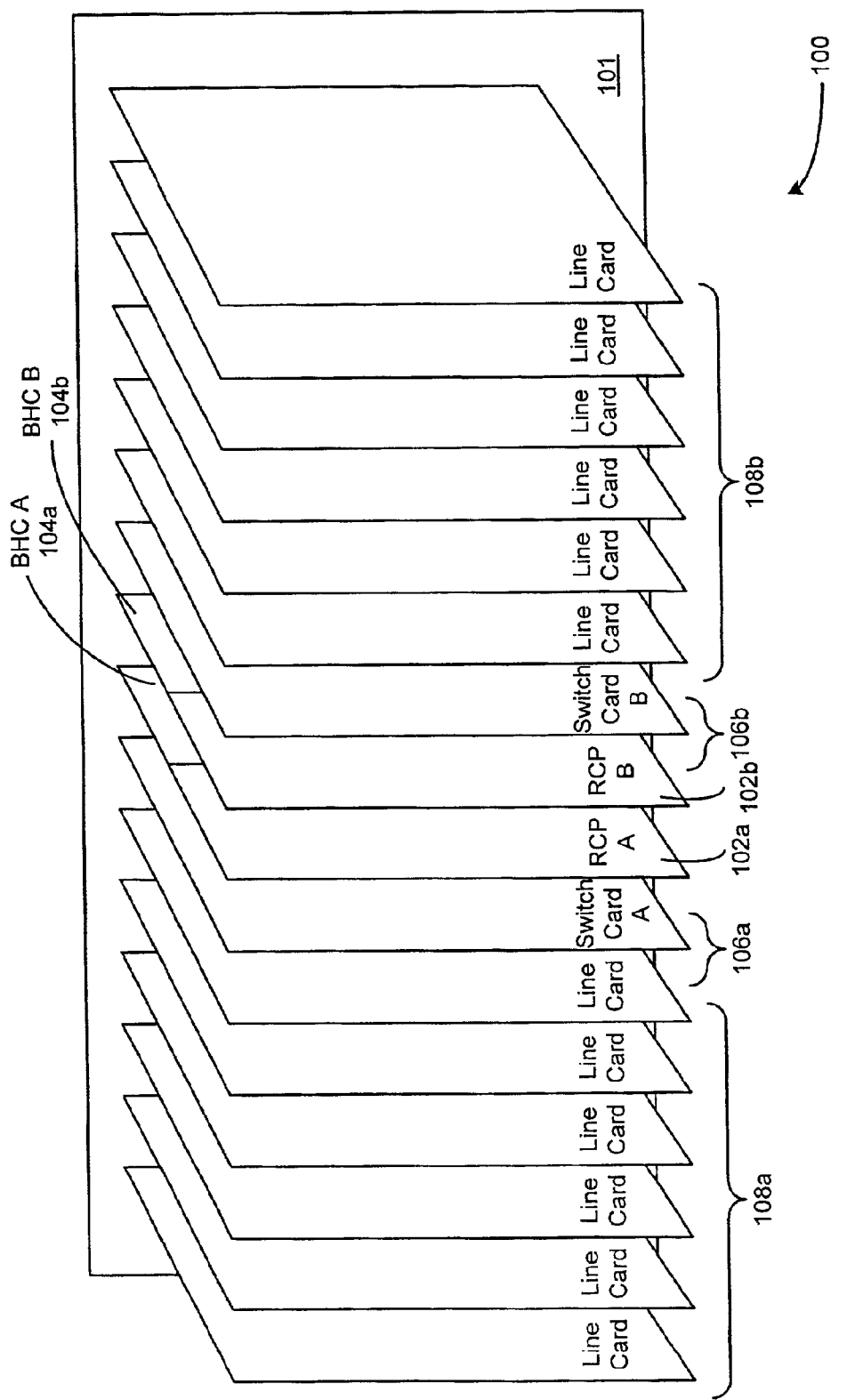
FIG. 1 is a diagrammatic representation of a network device having printed circuit cards coupled to a midplane and including a redundant control plane architecture in accordance with the present invention.

Components included within the presently disclosed network device 100 are depicted in FIG. 1. The network device 100 includes a midplane 101 that selectively interconnects a plurality of printed circuit cards within the network device. More specifically, the printed circuit cards illustrated in FIG. 1 include first and second Router Control Processors (RCPs) 102a, 102b, first and second Bridge Hotswap Cards (BHCs) 104a, 104b and first and second pluralities of line cards 108a and 108b. The line cards each typically include one or more input ports 113 for receiving data over input communication links 115 and one or more output ports 117 for forwarding data from the network device 100 over associated output communication links 119 (one each shown; see FIG. 2). The network device 100 further includes first and second Switch Cards 106a, 106b, first and second switch fabrics 111a and 111b (see FIG. 2) within the first and second Switch Cards 106a and 106b, respectively, physical device interfaces (PHYs) as known in the art (not shown) for connection of the Line Cards 108a, 108b to the applicable communication media, and a common I/O card 103 (see FIG. 2) that includes logic used in the selection of a Master RPC/BHC pair. The Line Cards 108a, 108b, the Bridge Hotswap cards 104a, 104b and the Switch Cards 106a, 106b are electrically interconnected as discussed below via conductive traces on the midplane 101. The RCP cards 102a, 102b are communicably coupled to the Bridge Hotswap cards 104a and 104b respectively, and reside in the rear portion of the midplane slots occupied by the Bridge Hotswap cards 104a and 104b respectively.

Figure 2:
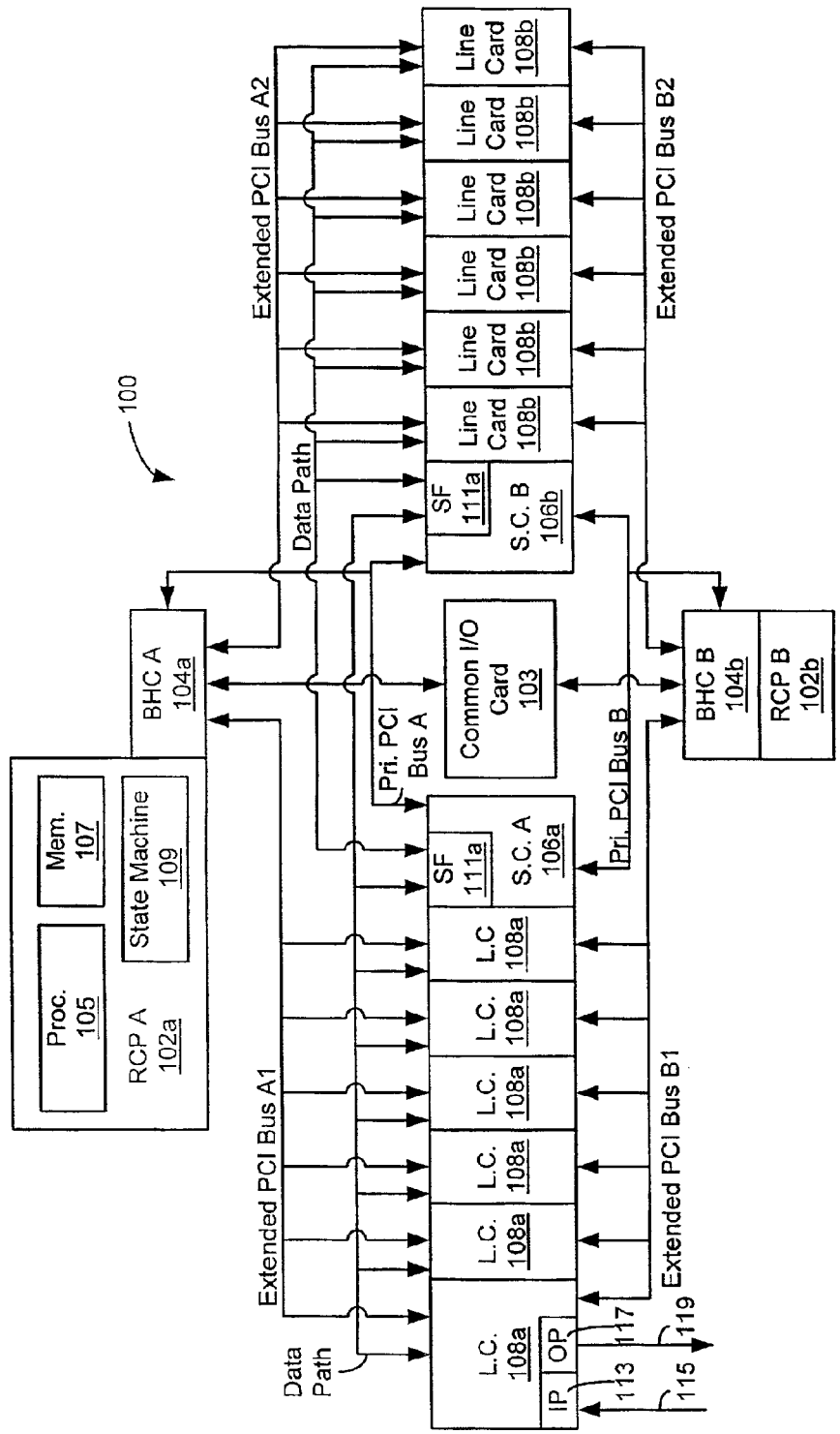
FIG. 2 is a block diagram depicting the redundant control plane architecture included in the network device of FIG. 1.

As depicted in the block diagram of FIG. 2, RCP A 102a is coupled to BHC A 104a and RCP B 102b is coupled to BHC B 104b. One of the RCP/BHC pairs is the Master pair for control of the control plane at any given time and the other RCP/BHC pair is in a standby mode. The master RCP/BHC pair is the master of the control plane and permits external control of the network switch via the well-known Simple Network Management Protocol (SNMP) protocol or a Command Line Interface (CLI) protocol from a remote Network Operations Center (NOC) (not shown) via an Ethernet interface that is subsequently discussed.

The RCPs each include a processor 105 that executes programs out of a memory 107 to perform integrity checking of the respective card and to control the transmission of configuration information to the respective Line Cards over the control plane. Additionally, the processors 105 perform system synchronization between RCPs and participate in initialization functions to assure that a functional RCP 102 assumes the role as the master RCP. Although the RCP and BHC functions are separated into distinct printed circuit cards in the disclosed system, it should be appreciated that components and/or functions described with respect to one of these cards may readily be partitioned or included in the other one of these cards, or the functions of both may be combined. The RCPs also include a state machine 109 that serves to determine whether the respective RCP is the Master of control plane or a standby RCP as subsequently discussed.

In the event of the failure of the master RCP/BHC pair and in the event of the planned changeover from one RPC/BHC pair to the other RPC/BHC pair, if the standby RCP/BHC pair is able to function as the master, the standby RCP/BHC pair assumes the role of the Master RCP/BHC pair so as to permit the control plane within the network device to continue to function without interfering with the data forwarding operations within the data plane.

RCP A 102a and BHC A 104a are coupled via a Primary PCI Bus A to the Switch Card A 106a and to the Switch Card B 106b. Similarly, RCP B 102b and BHC B 104b are coupled via Primary PCI Bus B to the Switch Card A 106a and Switch Card B 106b. The BHC A 104a and the BHC B 104b are each coupled to first and second pluralities of Line Cards 108a and 108b respectively, over Extended PCI buses to permit communication between the respective RCP/BHC pair and the pluralities of Line Cards 108a, 108b. More specifically, BHC A 104a is coupled to the first plurality of Line Cards 108a via Extended PCI Bus A1 and BHC A 104a is coupled to the second plurality of Line Cards 108b via Extended PCI Bus A2. Additionally, BHC B 104b is coupled to the first plurality of Line Cards 108a via Extended PCI Bus B1 and BHC B 104b is coupled to the second plurality of Line Cards 108b via Extended PCI Bus B2. In the illustrated embodiment, BHC A 104a includes bridge logic that allows communication between the RCP A/BHC A pair and the first and second pluralities of Line Cards 108a and 108b over the Extended PCI Bus A1 and the Extended PCI Bus A2 respectively. Similarly, BHC B 104a includes bridge logic that allows communication between the RCP B/BHC B pair and the first and second pluralities of Line Cards 108a and 108b over the Extended PCI Bus B1 and the Extended PCI Bus B2 respectively.

In the illustrated embodiment RCP A 102a is communicably coupled to the first plurality of Line Cards 108a via the Primary PCI Bus A and the Extended PCI Bus A1 and to the second plurality of Line Cards 108b via the Primary PCI Bus A and the Extended PCI Bus A2. RCP B 102b is communicably coupled to the first plurality of Line Cards 108a via the Primary PCI Bus B and the Extended PCI Bus B1 and to the second plurality of Line Cards 108b via the Primary PCI Bus B and the Extended PCI Bus B2. The buses are generally implemented in the form of compact PCI buses as known is the art although any suitable bus structure and protocol may be employed.

As indicated above, the Switch Card A 106a and Switch Card B 106b are the primary conduits for inter-RCP communications and additionally include switch fabrics 111a and 111b respectively for performing data forwarding within the data plane. Either Switch Card A 106a or Switch Card B 106b may be the active Switch Card for inter-RCP communication at any given time and the other Switch Card is the standby Switch Card for inter-RCP communication during normal operation.

Bridge Hotswap Card

Figure 3:
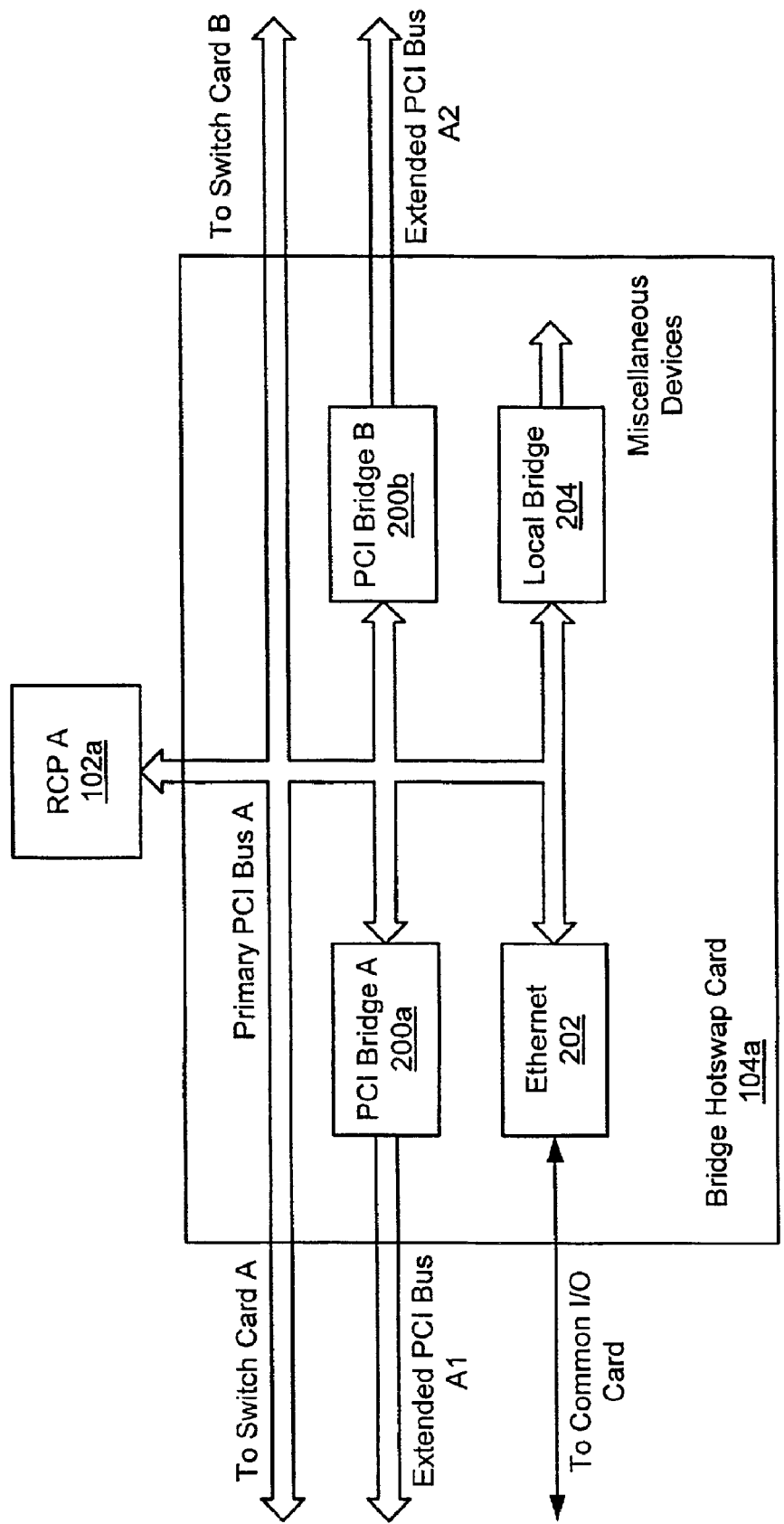
FIG. 3 is a block diagram of a Bridge Hotswap Card of the type depicted in FIGS. 1 and 2.

FIG. 3 depicts a block diagram of the Bridge Hotswap Card (BHC) 104a. The BHC A 104a includes a PCI Bridge A 200a, a PCI Bridge B 200b, an Ethernet controller 202 and a local bridge 204. The PCI Bridge A 200a and PCI Bridge B 200b are transparent PCI-to-PCI bridges and are employed to extend the Primary PCI Bus A. More specifically, PCI Bridge A 200a communicably couples the Primary PCI Bus A to the Extended PCI Bus A1 and the PCI Bridge B 200b communicably couples the Primary PCI Bus A to the Extended PCI Bus A2. The PCI Bridge A 200a and the PCI Bridge B 200b may comprise commercially available PCI interface devices such as the 21554 PCI-to-PCI Bridge manufactured by Intel Corporation.

The Ethernet Controller 202 located on the BHC A 104a is coupled to the Common I/O card 103 (See FIG. 2) to provide communication between the Common I/O card and RCP A. The Ethernet Controller 202 allows for connectivity to the Network Operations Center (NOC) for remote configuration of the network device. The Ethernet Controller 202 may comprise a conventional commercially available Fast Ethernet Controller such as the 82559 device manufactured by Intel Corporation.

In addition to serving as a PCI bus extender, the Bridge Hotswap Card 104a supports hot-swap card management and selection of the master RCP via interaction with the Common I/O card 103 which serves as the network management access point.

The block diagram of BHC B 104b is the same as shown for BHC A 104a noting that BHC 104b interfaces to RCP B 102b, PCI Bridge A 200a is coupled to Extended PCI Bus B1 and PCI Bridge B 200b is coupled to Extended PCI Bus B2.

The BHC cards each include a plurality of card management registers. More specifically the BHCs include a card management register for each Line Card within the first and second pluralities of Line Cards 108a and 108b. Additionally, the BHC A 104a and the BHC B 104b include a card management register that is associated with each one of the Switch Cards A 106a and B 106b, respectively.

The BHC A 104a and the BHC B 104b each have a separate board reset that has been added to the conventional compact PCI (cPCI). The reset signal for each board can be asserted from one bit of the respective card management register.

Primary PCI Bus A and Primary PCI Bus B each include a bus reset signal, however, assertion of the respective signal only resets devices on the particular Primary PCI Bus. This reset signal does not cause a reset of the devices coupled to the respective Extended PCI buses. Each device coupled to the Extended PCI buses includes an individual board reset as discussed above. The individual board reset signals advantageously allow particular boards to be reset in the event a specific board appears to be experiencing errors. The ability to reset individual boards using the board reset signal thus allows a single board to be reset without disturbing the operation of other cards that are fully operational. Only the master RCP is permitted to cause the board reset signals to be asserted. Accordingly a failed RCP or a BHC that is not active, or has been deselected, cannot assert a board-reset signal.

The PCI specification (as known in the art) calls for an interrupt signal (the INTA signal) to be bused as a common signal. In the disclosed system, however, the INTA signal is not bused on the Extended PCI Buses. Instead, the INTA signals emanating from the line cards 108 are run individually to both BHC A 104a and BHC B 104b. A BHC interrupt register is provided and each INTA signal from a respective one of the line cards 108 sets a different bit within the respective BHC A 104a and BHC B 104b interrupt registers. Thus, unlike the normal technique for handling PCI interrupts in which PCI devices are polled to ascertain which card caused the interrupt, the master RCP, be it RCP A 102a or RCP B 102b, can read the interrupt register on the associated BHC card, to determine which line card(s) 108 have generated an interrupt.

Bits set within the BHC A 104a and BHC B 104b interrupt registers cause an interrupt to RCP A 102a and RCP B 102b respectively, if interrupts are enabled. Moreover, an interrupt mask register is provided on each BHC 104 that permits interrupts from individual line cards to be enabled or disabled.

Switch Card

Figure 4:
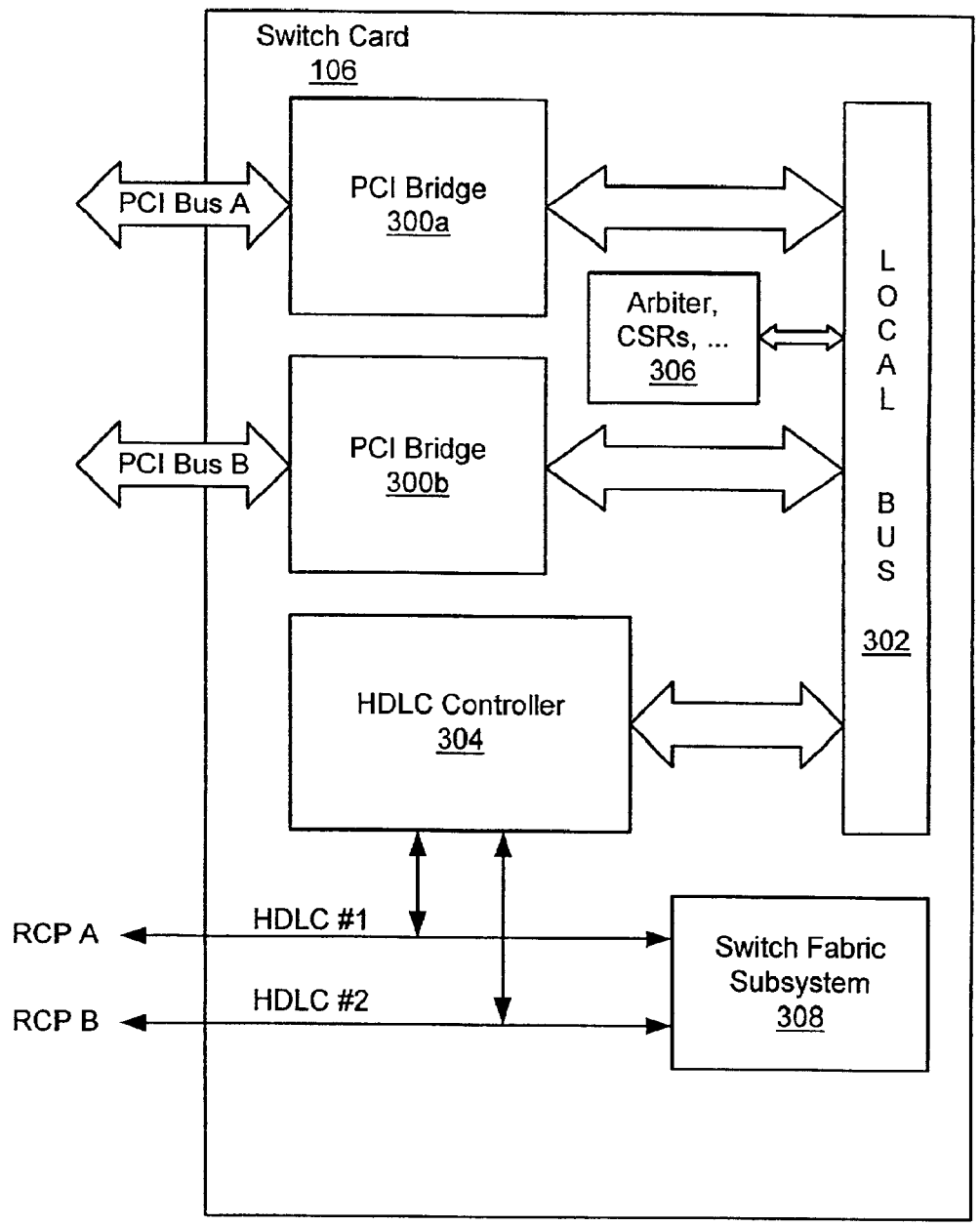
FIG. 4 is a block diagram of a portion of a Switch Card of the type depicted in FIGS. 1 and 2 illustrating control plane logic within the Switch Card.

FIG. 4 depicts an illustrative block diagram of the Switch Card 106 that corresponds to the Switch Card A 106a and Switch Card B 106b depicted in FIGS. 1 and 2. The block diagram only depicts the portion of the Switch Card logic that pertains to the redundant control plane and does not illustrate the switch fabric that is employed within the data plane for traffic forwarding. The Switch Card A 106a and the Switch Card B 106b comprise the primary pathway for inter-RCP communications. The RCP-to-RCP communications are used primarily to maintain consistency between the RCP master and RCP standby device. RCP state information is passed between RCPs using one of the Switch Cards 106a, 106b as a conduit. The Switch Card that serves as the conduit for transfer of information may be either the Switch Card on which the active switch fabric resides or the other Switch Card.

More specifically, the Switch Cards (See FIG. 4) include first and second PCI Bridges 300a and 300b. The first PCI Bridge 300a on the Switch Card 106 is communicably coupled to Primary PCI Bus A (FIG. 2) and to a local bus 302. The second PCI Bridge 300b on the Switch Card 106 is communicably coupled to the Primary PCI Bus B (FIG. 2) and to the local bus 302. The Switch Card 106 further includes arbitration logic 306 and a decode Programmable Logic Device (PLD) (not shown) that allows either the first or second PCI Bridge 300a or 300b to be the master of the local bus 302. Thus, a memory operation may come in from one PCI Bus and be forwarded onto the other PCI Bus if the PCI Local Bus bridge is configured properly to map a window of local bus addresses to a block of the PCI address space. In particular, each RCP maintains a window of memory space into which the other RCP can write messaging data. This window of address space is also defined in each of the PCI bridges on the Switch Cards 106a, 106b. From the perspective of the Switch Cards, any PCI write command received from an RCP/BHC at one of its PCI bridges can be decoded for the Switch Card itself or be decoded by the Switch Card's other PCI bridge. If the PCI write command is decoded by the Switch Card's other PCI bridge, the PCI write command is sent to the other RCP/BHC and the other RCP/BHC then writes the data into its main memory in response to the write command.

Each Switch Card 106 also includes control status registers (CSRs) 306 that hold control information for the respective Switch Card. For example, the CSRs contain a switch fabric reset bit, an HDLC controller enable bits and interrupt mask registers. The CSR registers also contain status information for the respective Switch Card 106 that identifies whether the Switch Card is the active Switch Card, Switch identifier, a revision identifier, interrupt and error bits.

The HDLC Controller 304 is used to communicate with a processor within the Switch Fabric Subsystem 308 on the respective Switch Card 106. All communication with the processor and the RCP is via HDLC commands.

RCP Card Availability Registers

The BHC card within each RCP/BHC pair includes an Availability Register that is employed for RCP initialization sequencing, maintenance of RCP status information and maintenance of information pertaining to the respective BHC. In the presently disclosed system, the Availability Registers are disposed on the BHCs although the registers may alternatively be located on the RCPs. The Availability Registers include registers for maintenance of a Processor Number, Current Master information, a Master-Capable indication, a Master Watchdog, Peer Control information, and Peer Status Information. The information associated with these registers is identified more fully below.

Processor Number—This register includes an identification of the slot identification in the midplane in which the respective RCP and BHP resides.

Current Master—This register is used to inform the respective RCP the slot identification in the midplane that contains the current Master for the redundant control plane. This register reflects the decision made by the Common I/O Card 103 (See FIG. 2) regarding the particular RCP/BHC pair that was selected as the master.

Master-Capable—Each RCP/BHC pair includes an indication that it is eligible to become a Master. This indication is available to the Common I/O Card 103 and is tested prior to selection of a particular RCP/BHC pair as the Master pair for the network device.

Master-Watchdog—Periodically, data is written to the Master-Watchdog register to assert Master eligibility and to maintain Master status once an RCP/BHC pair has been selected as the Master pair. More specifically, the Master-Watchdog circuit must continually write a bit (once per specified time period) to the CSR associated with the respective RCP to indicate that the respective RCP is capable of serving as the master RCP. When the write occurs, a counter is preset. The counter is decremented and if no further write to the CSR bit occurs within the time period specified by the counter preset, then mastership is not given to the RCP or, if the RCP is already the master, mastership may be revoked.

Peer Control—A register is provided that includes bits and fields that provide controls to the other RCP.

Interrupt Peer; Writing a 1 to this bit causes an interrupt to the peer RCP (if the peer RCP is enabled). More specifically, writing a 1 to this bit causes a pulse signal to the peer. In response to the pulse signal, the peer RCP latches the pulse signal as a status bit. This bit always reads as a 0.

Peer Status—These registers include bits and fields pertaining to the other RCP/BHC pair. These bits and fields are read-only.

Peer RCP/BHC Present; Provides an indication that the other RCP/BHC pair is present. This status bit provides no information regarding the operational state of the other RCP/BHC pair.

Peer RCP/BHC Powered Up; The RCP and Bridge Card are treated as a unit. This register provides an indication that the other RCP/BHC pair is powered.

Peer Interrupt Request—This register provides an indication that the other peer RCP/BHC pair requested an interrupt.

Common I/O Card

Figure 5:
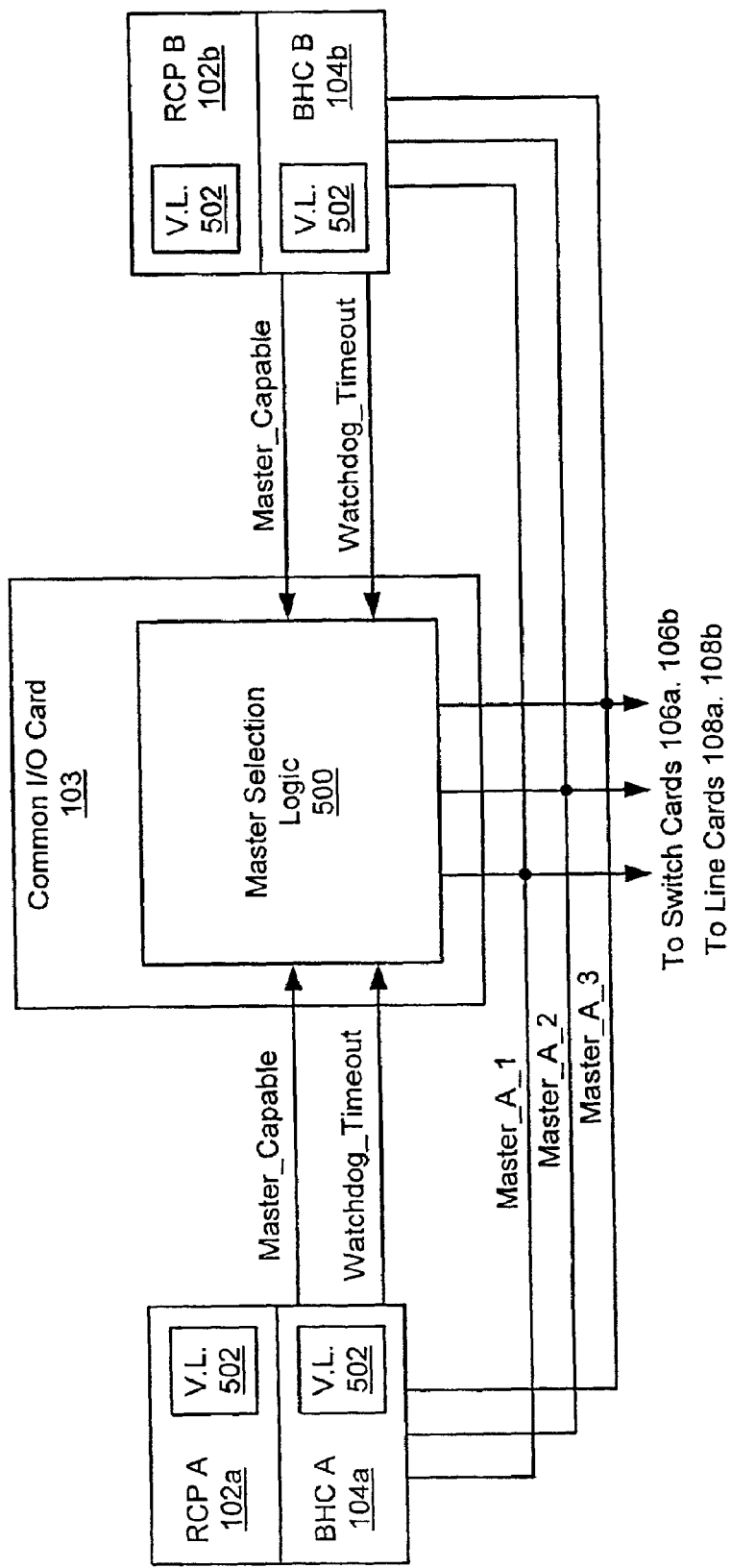
FIG. 5 is a block diagram illustrating connections to and from Master Selection Logic of a Common I/O Card depicted in FIG. 2.

The election of the Master RCP/BHC pair is established by Master Selection Logic on the Common I/O Card 103 (see FIGS. 2, 5). The Common I/O Card 103 Master Selection Logic 500 accesses the RCP/BHC Availability Registers pertaining to the respective RCP/BHC pairs and makes a determination as to which of the RCP/BHC pairs will serve as the Master for the control plane. The results of the Master Selection by the Common I/O Card 103 are distributed to all cards as triply redundant signals. Voting logic is employed at each of the cards to ascertain which RCP/BHC of the RPC/BHC pair is the Master. As a result of the use of the voting technique, the correct Master RCP/BHC pair will be selected and identified on each of the cards within the control plane even in the event of a single bit error in the Master Selection Logic 500 output or in the triply redundant Master identification signals.

The Master pair selection may be made using hard coded logic, a state machine, a software routine executed on a processor or via any other suitable selection technique.

In one embodiment, each RCP/BHC pair is fully connected to the first and second pluralities of line cards via the applicable Primary PCI Bus and the corresponding Extended PCI Buses. Thus, a failure within either the RCP or the BHC, or any of the associated buses coupling the respective pair results in a failover to the other RCP/BHC.

Alternatively, the second plurality of Line Cards 108b may be configured as redundant line cards for the first plurality of Line Cards 108a and one of the PCI Bridges within the respective BHC may be selected as active while the other PCI Bridge is deselected. In the event of a failure in one of the first plurality of Line Cards 108a, a failure along the Extended PCI Bus coupling the respective BHC and the first plurality of Line Cards 108a or in the event of a controlled change in the configuration of the control plane, the system may initiate a failover to the second plurality of Line Cards 108b using the other PCI Bridge within the BHC and the other Extended PCI Bus or a switchover as applicable. Similarly, a failover or switchover from the second plurality of Line Cards 108b to the first plurality of line cards 108a may be initiated in the event of a failure in one or more of the second plurality of Line Cards, a failure in the applicable Extended PCI Bus, or as a controlled changeover in the configuration of the system.

Common I/O Card Selection Logic for RPC/BHC

Referring to FIG. 5, Master Selection Logic 500 is disposed on the Common I/O Card 103. The Master Selection Logic 500 receives two inputs from each of the BHC cards that are used in the Master selection process, namely, a Master_Capable signal and a Watchdog Timer signal. The Master Selection Logic 500 generates three output signals designated Master_A_1, Master_A_2, and Master_A_3 that represent a triply redundant identification of the RCP/BHC pair that will act as the Master for the control plane. These signals are discussed in greater detail below.

Master_Capable Signal

As indicated above, the Master_Capable signal may be generated by the RCP and stored in the Availability Registers within the respective BHC. The Master_Capable signal indicates to the Master Selection Logic 500 that the respective RCP/BHC pair is capable of becoming the Master pair for the control plane.

The Master_Capable signal is generated under software control and may be generated upon the satisfaction of any number of predetermined tests and criteria. For example, the Master_Capable signal may be asserted in the event the respective RCP/BHC pair passed a specified set of diagnostics, a determination is made that the software revision running within the respective RCP is appropriate, the respective RCP has sufficient memory and there are otherwise no detected hardware faults. For example, loss of communication with one or more line cards, loss of communication external of the chassis, an over-temperature condition, a detected parity error or other hardware errors may result in the deassertion of the Master_Capable signal.

Master_Watchdog Signal

The Master_Watchdog signal is written periodically to assert Master eligibility and to maintain Master status once selected. In the event the Master_Watchdog signal is not written within the specified period for any reason from an RCP that is the current Master of the control plane, a failover will occur and the current Master may lose the Master role. If a Master_Watchdog signal is not written within the specified timeout period and the respective RCP was in standby mode, it will no longer be eligible to the become the Master. In one embodiment, the Master_Watchdog signal is reasserted approximately every tenth of a second in the event the predetermined criteria are satisfied.

The Master_Watchdog signal may be generated as a result of the retesting of all of some of the criteria for assertion of the Master_Capable signal. In the illustrated embodiment, the Master_Watchdog signal is prevented from timing out if no runtime communication errors are detected and if the current Master has established connectivity with the NOC.

RCP Initialization and Selection

During a system boot, the RCP Management code within the boot software image of each RCP makes a determination of whether the respective RCP is capable of acting as the Master of the control plane. If so, the respective RCP asserts the Master_Capable signal through the associated BHC driver.

When the system is powered up, the Master Selection Logic 500 identifies one of the two RCP/BHC pairs as the Master even though neither RCP has asserted the Master_Capable signal and/or reset the Master_Watchdog signal. The identification of one of the RCP/BHC pairs as the Master, however, is not considered valid until one RCP has actively asserted the Master_Capable signal.

The RCP system manager, on power up must determined its identity. This is accomplished by making a call to the BHC driver that returns the slot of the BHC and associated RCP from the Availability Register. An RCP in slot 8 is considered RCP A 102*a* and an RCP in slot 9 is considered RCP B 102*b*.

Following the identification of the RCP, the RCP system manager launches an RCP Integrity task. The RCP Integrity task is responsible for monitoring and verifying the integrity of the RCP. The RCP system manager will prevent the respective RCP from performing the functions of the Master until the role for that RCP has been determined.

The initial portion of the RCP Integrity task involves the determination of whether the respective RCP is capable of performing the tasks of the Master and if so, to assert the Master_Capable signal to the respective Availability Register. The RCP Integrity task then checks the state of the Master_A_n signals to determine which RCP has been identified as the Master by the Master Selection Logic 500. The Master Selection Logic 500 allows each RCP to check the state of the Master_A_n signals after a very short delay to allow time for the Master Selection Logic to complete the selection process.

In response to the assertion of the Master_A_n signals, logic on the Common I/O card enables the NOC communications port for the selected Master and the Master RCP attempts to establish communications with the NOC. The RCP Integrity task runs periodically to verify that the respective RCP remains Master capable. In the event the RCP that is executing the Integrity task determines that the integrity verification tests have failed, the Watchdog_Timer signal is allowed to timeout.

If the RCP is determined to be Master Capable and asserts the Master_Capable signal, but is assigned the standby role by the Master Selection Logic 500 (as indicated by the signals Master_A_n), the respective RCP will only attempt to establish communication with the Master RCP.

Additionally, if the RCP does not determine itself to be Master Capable, it will deassert the Master_Capable signal within the respective Availability Register.

Master Selection Logic

The Master Selection Logic 500 is combinatorial logic in the illustrated embodiment and serves to generate the triply redundant Master_A_n output signals (FIG. 5) that are used by all cards in the system to identify the Master processor within the control plane. Upon power up of the system, the Common I/O Card 103 waits for 1 second after the negation of the system reset before sampling the Master_Capable and Watchdog_Timeout signals from RCP/BHC pairs. In the illustrated embodiment, the selected pair is the RCP A/BHC A pair. If only one RCP/BHC pair is detected as being Master Capable that RCP/BHC pair is selected as the Master for the control plane. If both RCP/BHC pairs are detected as being Master Capable, the RCP/BHC pair in slot 8 is selected as the Master for the control plane. If neither RCP is detected as being Master Capable, the RCP/BHC pair in slot 8 is selected as the Master for the control plane although the designation is non-functional.

If at any time during operation, the Master Selection Logic 500 detects the negation of the Master_Capable signal or a timeout of the Watchdog_Timeout signal from the Master RCP/BHC pair, a failover or switchover to the other RCP/BHC pair will occur if the other RCP/BHC pair is asserting its Master_Capable signal to the Master Selection Logic 500. If an RCP/BHC pair that comprises the standby pair is not Master Capable or is not installed no failover or switchover will occur.

Master Voting Logic

Each of the cards within the system includes receivers for receiving the Master_A_n signals from the Master Selection Logic 500 and voting logic 502. The voting logic inspects the Master_A_n signals and identifies the RCP A/BHC A pair as the master of the control if at least two of the three Master_A_n signals are asserted and identifies the RCP B/BHC B pair as the Master of the control plane if at least two of the three Master_A_n signals are deasserted. As a result of the use of the triply redundant Master_A_n signals along with the voting technique herein described, any single failure in the Master Selection Logic or along the Master_A_n signal paths will not interfere with the selection of the proper Master RCP/BHC pair. The Master_A_n signals are depicted in FIG. 6 and identify the selected Master in the face of possible single bit errors.

RCP State Machine

Figure 7:
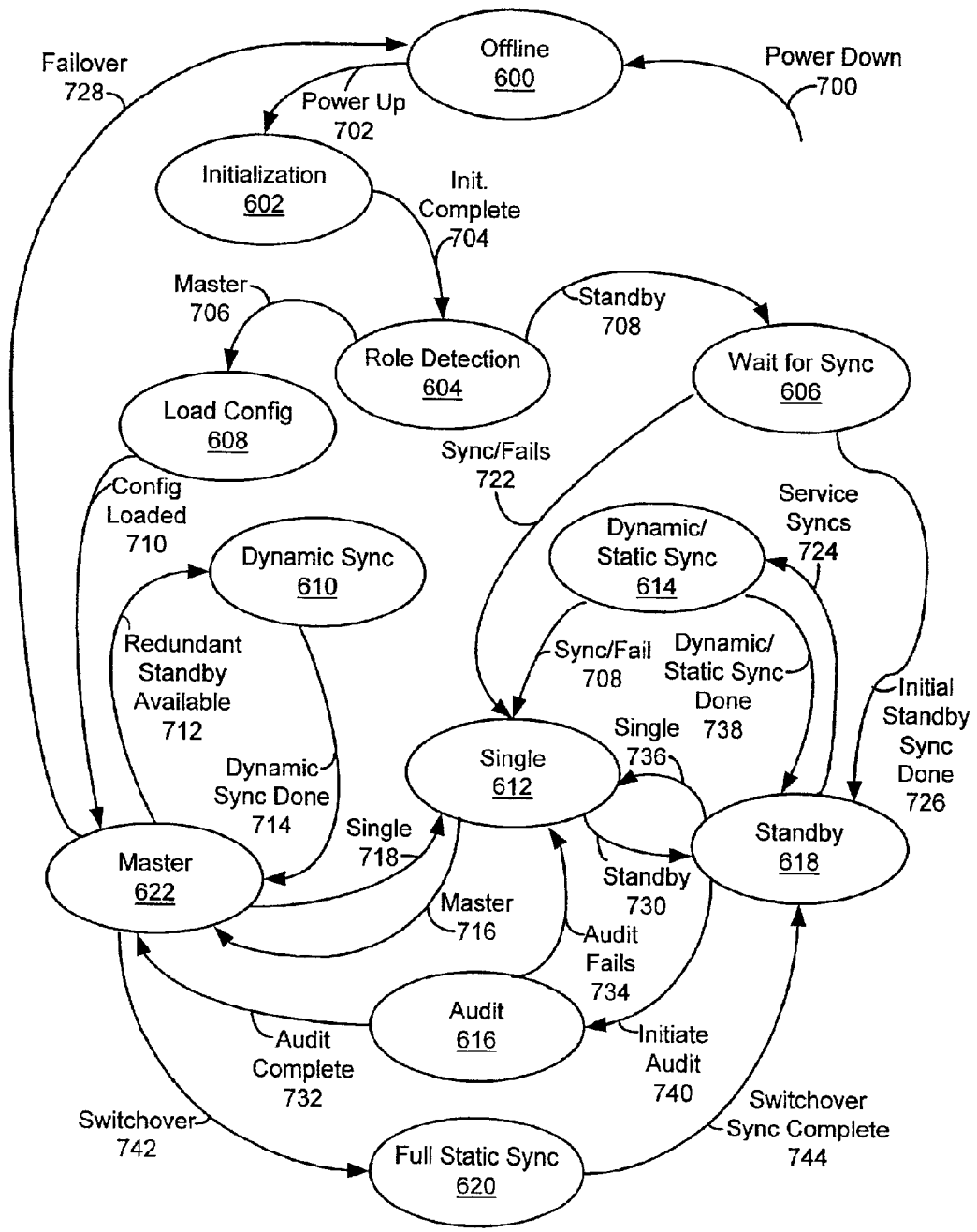
FIG. 7 depicts a state diagram illustrating operation of a state machine within an RCP responsible for RCP state detection and transitions.

RCP A 102a and RCP B 102 b each include a state machine 109 (FIG. 2) that manages the master selection within the respective device. The operation of the state machine is depicted in FIG. 7. Referring to FIG. 7, the RCP starts off in an offline state 600. Upon the occurrence of a power up condition 702, the RCP enters an initialization state 602 and RCP management software executes an initialization sequence as described above. Upon completion of the initialization sequence as indicated by event 704, the RCP enters a Role Detection state in which it evaluates via voting logic 502 the Master_A_n signals. In the event the respective RCP voting logic 502 determines that the respective RCP is identified as the Master RCP as indicated by event 706, the RCP proceeds to state 608 in which configuration information for the RCP is loaded from a remote NOC. Following the loading of the configuration code from the NOC as indicated by event 710, the RCP transitions to the Master state 622 and exercises control over the control plane for the network device.

If during the Role Detection state 604, the RCP voting logic 502 indicates that the respective RCP is not the Master unit, the RCP is identified as a possible standby RCP as indicated by event 708 and the state machine transitions to state 606 in which the respective RCP attempts to synchronize register and configuration information with the Master RCP via inter-RCP communication logic on the designated Master Switch Card. If the respective RCP successfully achieves configuration and register synchronization as indicated by event 726, the RCP proceeds to standby state 618.

As indicated in the state diagram, the state machine may transition from the Wait for Sync state 606 to a Single state 612 via a Sync Fails event 722 initiated by management control software. The single state is entered in this manner when the RCP determined to the standby RCP cannot synchronize with the RCP determined to be the Master RCP. In the Single state 612 the respective RCP is capable of performing the function of the Master however, that respective RCP is not capable of performing a hardware failover. Rather, the respective RCP must transition from the Single state 612 to the Master state 622, under control of management software and accordingly, a greater amount of information in the data plane may be lost due to the lack of synchronization between the Master and Standby RCP as well as the latency in the software controlled failover. When transitioning from the Single state 612 to the Master state 622, management software establishes and verifies the configuration of the respective RCP prior to the transition step 716 depicted in FIG. 7. Additionally, the RCP may transition from the Master state 622 to the Single state 612 under the control of management software.

The RCP may transition from the Standby state 618 to the Single state 612 under control of management software as indicated by transition event 736 and additionally, may transition from the Single state 612 to the Standby state 618 under control of management software as indicated by transition event 730.

While an RCP is in Standby state 618 it periodically initiates an attempt to synchronize its configuration information with the Master RCP as indicated by the service syncs event 724. Accordingly, in the Dynamic/Static Sync state 614, the standby RCP tests the inter-RCP communication path and the configuration of the RCP in Standby state 618 to ascertain whether inter-RCP communications between the Standby RCP and the Master RCP are functional and whether the configuration information in the Standby RCP is current. If, as a result of the synchronization operation undertaken in the Dynamic/Static Sync state 614, inter-RCP communications are verified and synchronization of the RCP in the standby state with the Master RCP is successfully completed as indicated by the Dynamic/Static Sync Done event 738, the RCP returns to the Standby state 618. If the attempt to synchronize the RCP in the Standby state 618 with the Master RCP fails as indicated by the Sync/Fail event 708, the respective RCP exits the Standby state 618 and transitions to the Single state 612.

As indicated above, the Single state 612 indicates that the respective RCP has the ability to act as the Master, however, it has been unable to properly Synchronize with the acting Master via inter-RCP communications. Accordingly, an RCP in the Single state 612 cannot rapidly transition to the Master state via a hardware switchover/failover but can be driven to the Master state via a software controlled failover/switchover.

In a software controlled failover/switchover from the Standby state 618 to the Master state 622, management control software initiates a failover/switchover event as indicated by transition event 740 and the RCP enters an Audit state 616 in which the management control software verifies the ability of the respective RCP to act as the Master of the control plane. In the event the audit completes successfully, as indicated by the Failover/Switchover Audit complete event 732 the RCP enters the Master state 622 and serves as the Master RCP. If the audit undertaken by the management control software in the Audit state 616 reveals that the respective RCP is not appropriately configured to act as the Master of the control plane, the respective RCP transitions to the Single state 612 as illustrated by transition step 734.

During a Switchover event, in which the RCP changes from the Master to the Standby RCP, the RCP state machine enters a Full Static Sync state 620 following a Switchover event 742. In the Full Static Sync state 620 the synchronization of the configuration information within the Master and the Standby RCP are achieved prior to the switchover from the Master state 622 to the Standby state 618. After synchronizing the Master configuration information and the Standby configuration information, the Master unit transitions to the Standby state 618 as depicted by transition event 744.

When in the Master state 622, from time to time the Master unit initiates a Redundant Standby Available event 712 that transitions the state machine to a Dynamic Sync state 610. In the Dynamic Sync state 610 the state machine attempts to verify inter-RCP communications and synchronization of the Master configuration with the Standby RCP configuration. If the tests in the Dynamic Sync state 610 are successfully completed as indicated by a Dynamic Sync Done event 714, the state machine returns to the Master state 622.

Finally, in the event of the detection of a failure within the current master RCP as indicated by a failover event 728, the Master RCP enters an offline state 600.

It will be understood by those of ordinary skill in the art that variations to and modifications of the above described system for selecting a master controller for a redundant control plane in a network switch may be made without departing from the inventive concepts described herein. Accordingly, the invention should not be viewed as limited except as by the scope as spirit if the appended claims.

What is claimed is:

1. Apparatus for configuring a control plane in a network device having at least one line card for receiving and transmitting data, said at least one line card being communicably coupled to at least one switch fabric via at least one data path, said apparatus comprising:

first and second control plane processor elements, each operative to generate at least one status signal indicative of the operational status of the respective processor element;

first and second control paths associated with said first and second control plane processor elements respectively and communicably coupling said first and second control plane processor elements respectively to said at least one line card, said first and second control paths being isolated from said at least one data path;

selection logic operative in response to said at least one status signal from said first and second control plane processor elements for generating at least one identification signal for identifying one of said first and second control plane processor elements as an Master control plane processor and for communicating said at least one identification signal to said first and second control plane processor elements;

one of said first and second control plane processor elements being operative in response to receipt of said at least one identification signal to configure itself as said active control plane processor element; and said active control plane processor element being operative to transmit configuration information over the associated control path to said at least one line card, said configuration information includes at least one forwarding table.

2. The apparatus of claim 1 wherein said configuration information includes at least one software image for execution on said at least one line card.

3. The apparatus of claim 1 wherein said at least one identification signal comprises a triply redundant identification signal and each one of said first and second control plane processor elements includes voting logic for identifying said first processor element as said active control plane processor element if at least two of said triply redundant identification signals are of a first state and for identifying said second processor element as said active control plane processor element as said active control plane processor element if at least two of said triply redundant identification signals are of a second state.

4. The apparatus of claim 1 further including interface logic communicably coupling said first and second control plane processor elements, said active control plane processor element being operative to transmit state information regarding said active control plane processor element to said standby control plane processor element via said interface logic.

5. The apparatus of claim 1 further including first and second interface logic, each of said first and second interface logic communicably coupling said first and second control plane processor elements, said first and second interface logic being responsive to said at least one identification signal to identify one of said first and second interface logic as active interface logic and the other one of said first and second interface logic as standby interface logic, said active control plane processor element being operative to transmit state information regarding said active control plane processor element to said standby control plane processor element via said active interface logic.

6. The apparatus of claim 1 wherein said at least one status signal includes first and second status signals, said first signal indicating in a first state that the respective control plane processor element has passed a first predetermined set of diagnostics and is capable of acting as said active control plane processor element, said second signal comprising a timeout signal that assumes a timeout state if the respective control plane processor element does not pass a second predetermined set of diagnostics that are run generally periodically.

7. A method for configuring a control plane in a network device, wherein said network device includes at least one line card for receiving and transmitting data over corresponding communication links, said at least one line card being communicably coupled to at least one switch fabric via at least one data path, wherein said at least one line card, said at least one data path and said at least one switch fabric comprise a data plane, said method comprising the steps of:

generating at least one status signal at first and second control plane processor elements, each of said at least one signal being indicative of the ability of the respective control plane processor element to function as an active control plane processor element for said control plane;

communicating said at least one status signal from said first and second control plane processor elements to selection logic;

generating within said selection logic at least one identification signal responsive to at least one status signal from said first and second control plane processor elements, said identification signal for identifying one of said first and second control plane processor element as said active control plane processor element;

communicating said at least one identification signal from said selection logic to said first and second control plane processor elements;

responsive to receipt of said at least one identification signal at said first and second control plane processor elements, configuring one of said first and second control plane processor elements as an active control plane processor element and the other one of said processor elements as a standby control plane processor element;

transmitting first configuration information from said active control plane processor element to said at least one line card over a first control path isolated from said at least one data path; and communicating state information regarding said active control plane processor element to said standby control plane processor element, including the step of communicating state information regarding said active control plane processor element to said standby control plane processor element via an interface electrically coupling said active and standby control plane processor elements.

8. The method of claim 7 wherein said at least one identification signal comprises a triply redundant identification signal and each one of said first and second control plane processor elements includes voting logic for identifying said first processor element as said active control plane processor element if at least two of said triply redundant identification signals are of a first state and for identifying said second processor element as said active control plane processor element.

9. The method of claim 7 wherein said step of generating at least one status signal comprises the step of generating first and second signals;
   said step of generating said first signal comprises the step of executing a first predetermined set of diagnostics in each control plane processor element that tests the ability of the respective control plane processor element to act as said active control plane processor element and generating said first signal in a first state if the respective control plane processor element has passed said first predetermined set of diagnostics; and
   said step of generating said second signal comprises the step of executing a second predetermined set of diagnostics within each of said control plane processor elements and producing said second signal in a timeout state if the respective control plane processor element does not pass said second predetermined set of diagnostics.

10. The method of claim 9 further including the step of reconfiguring said standby control plane processor element as a new active control plane processor element and reconfiguring said active control plane processor element as an inactive control plane processor element in the event (i) said second signal within said active control plane processor element assumes said timeout state, (ii) said first signal of said standby control plane processor element is in said first state, and (iii) said second signal of said standby control plane processor element has not assumed said timeout state.

11. The method of claim 10 wherein said steps of reconfiguring said active and standby control plane processor elements includes the step of generating a new at least one identification signal that identifies said standby control plane processor element as said new active control plane processor element and performing said reconfiguring steps in response to receipt of said new at least one new identification signal at said first and second control plane processor elements.

12. The method of claim 11 further including the step of communicating state information regarding said new active control plane processor element to said inactive control plane processor element following said reconfiguring steps.

13. The method of claim 7 further including the step of generating by said selection logic said at least one identification signal in a predetermined state to select a predetermined one of said first and second control plane processor elements as said active control plane processor elements if said at least one status signal from said first and second control plane processor elements indicate that both control plane processor elements are functional.

14. Apparatus for configuring a control plane in a network device having at least one line card for receiving and transmitting data, said at least one line card being communicably coupled to at least one switch fabric via at least one data path, said apparatus comprising:
   first and second control plane processor elements, each operative to generate at least one status signal indicative of the operational status of the respective processor element;
   first and second control paths associated with said first and second control plane processor elements respectively and communicably coupling said first and second control plane processor elements respectively to said at least one line card, said first and second control paths being isolated from said at least one data path;
   selection logic operative in response to said at least one status signal from said first and second control plane processor elements for generating at least one identification signal for identifying one of said first and second control plane processor elements as an Master control plane processor and for communicating said at least one identification signal to said first and second control plane processor elements, said at least one identification signal comprises a triply redundant identification signal and each one of said first and second control plane processor elements includes voting logic for identifying said first processor element as said active control plane processor element if at least two of said triply redundant identification signals are of a first state and for identifying said second processor element as said active control plane processor element as said active control plane processor element if at least two of said triply redundant identification signals are of a second state;
   one of said first and second control plane processor elements being operative in response to receipt of said at least one identification signal to configure itself as said active control plane processor element; and
   said active control plane processor element being operative to transmit configuration information over the associated control path to said at least one line card.

15. Apparatus for configuring a control plane in a network device having at least one line card for receiving and transmitting data, said at least one line card being communicably coupled to at least one switch fabric via at least one data path, said apparatus comprising:
   first and second control plane processor elements, each operative to generate at least one status signal indicative of the operational status of the respective processor element;
   first and second control paths associated with said first and second control plane processor elements respectively and communicably coupling said first and second control plane processor elements respectively to said at least one line card, said first and second control paths being isolated from said at least one data path;
   selection logic operative in response to said at least one status signal from said first and second control plane processor elements for generating at least one identification signal for identifying one of said first and second control plane processor elements as an Master control plane processor and for communicating said at least one identification signal to said first and second control plane processor elements;
   one of said first and second control plane processor elements being operative in response to receipt of said at least one identification signal to configure itself as said active control plane processor element;
   said active control plane processor element being operative to transmit configuration information over the associated control path to said at least one line card; and
   first and second interface logic, each of said first and second interface logic communicably coupling said first and second control plane processor elements, said first and second interface logic being responsive to said at least one identification signal to identify one of said first and second interface logic as active interface logic and the other one of said first and second interface logic as standby interface logic, said active control plane processor element being operative to transmit state information regarding said active control plane processor element to said standby control plane processor element via said active interface logic.

16. Apparatus for configuring a control plane in a network device having at least one line card for receiving and transmitting data, said at least one line card being communicably coupled to at least one switch fabric via at least one data path, said apparatus comprising:

first and second control plane processor elements, each operative to generate at least one status signal indicative of the operational status of the respective processor element;

first and second control paths associated with said first and second control plane processor elements respectively and communicably coupling said first and second control plane processor elements respectively to said at least one line card, said first and second control paths being isolated from said at least one data path, said at least one status signal includes first and second status signals, said first signal indicating in a first state that the respective control plane processor element has passed a first predetermined set of diagnostics and is capable of acting as said active control plane processor element, said second signal comprising a timeout signal that assumes a timeout state if the respective control plane processor element does not pass a second predetermined set of diagnostics that are run generally periodically;

selection logic operative in response to said at least one status signal from said first and second control plane processor elements for generating at least one identification signal for identifying one of said first and second control plane processor elements as an Master control plane processor and for communicating said at least one identification signal to said first and second control plane processor elements;

one of said first and second control plane processor elements being operative in response to receipt of said at least one identification signal to configure itself as said active control plane processor element; and said active control plane processor element being operative to transmit configuration information over the associated control path to said at least one line card.

17. The apparatus of claim 16 wherein said active control plane processor element ceases to function as said active control plane element and the other control plane processor element is configured as said active control plane processor element in the event (i) said second signal within said active control plane processor element assumes said timeout state, (ii) said first signal of said other control plane processor element is in said first state, and (iii) said second signal of said other control plane processor element has not assumed said timeout state.

18. The apparatus of claim 17 wherein said second predetermined set of diagnostics are executed approximately ten times per second.

19. A method for configuring a control plane in a network device, wherein said network device includes at least one line card for receiving and transmitting data over corresponding communication links, said at least one line card being communicably coupled to at least one switch fabric via at least one data path, wherein said at least one line card, said at least one data path and said at least one switch fabric comprise a data plane, said method comprising the steps of:

generating at least one status signal at first and second control plane processor elements, each of said at least one signal being indicative of the ability of the respective control plane processor element to function as an active control plane processor element for said control plane;

communicating said at least one status signal from said first and second control plane processor elements to selection logic;

generating within said selection logic at least one identification signal responsive to at least one status signal from said first and second control plane processor elements, said identification signal for identifying one of said first and second control plane processor element as said active control plane processor element;

communicating said at least one identification signal from said selection logic to said first and second control plane processor elements, said at least one identification signal comprises a triply redundant identification signal and said method includes the step of verifying that at least two of said triply redundant identification signals are of a first state to identify said first control plane processor element as said active control plane processor element and that two of said three triply redundant identification signals are of a second state to identify said second control plane processor element as said active control plane processor element;

responsive to receipt of said at least one identification signal at said first and second control plane processor elements, configuring one of said first and second control plane processor elements as an active control plane processor element and the other one of said processor elements as a standby control plane processor element; and transmitting first configuration information from said active control plane processor element to said at least one line card over a first control path isolated from said at least one data path.

20. A method for configuring a control plane in a network device, wherein said network device includes at least one line card for receiving and transmitting data over corresponding communication links, said at least one line card being communicably coupled to at least one switch fabric via at least one data path, wherein said at least one line card, said at least one data path and said at least one switch fabric comprise a data plane, said method comprising the steps of:

generating at least one status signal at first and second control plane processor elements, each of said at least one signal being indicative of the ability of the respective control plane processor element to function as an active control plane processor element for said control plane, wherein said step of generating at least one status signal comprises the step of generating first and second signals, said step of generating said first signal comprises the step of executing a first predetermined set of diagnostics in each control plane processor element that tests the ability of the respective control plane processor element to act as said active control plane processor element and generating said first signal in a first state if the respective control plane processor element has passed said first predetermined set of diagnostics, and said step of generating said second signal comprises the step of executing a second predetermined set of diagnostics within each of said control plane processor elements and producing said second signal in a timeout state if the respective control plane processor element does not pass said second predetermined set of diagnostics;

communicating said at least one status signal from said first and second control plane processor elements to selection logic;

generating within said selection logic at least one identification signal responsive to at least one status signal from said first and second control plane processor elements, said identification signal for identifying one of said first and second control plane processor element as said active control plane processor element;

communicating said at least one identification signal from said selection logic to said first and second control plane processor elements;

responsive to receipt of said at least one identification signal at said first and second control plane processor elements, configuring one of said first and second control plane processor elements as an active control plane processor element and the other one of said processor elements as a standby control plane processor element; and transmitting first configuration information from said active control plane processor element to said at least one line card over a first control path isolated from said at least one data path.

21. The method of claim 20 said step of executing said second predetermined set of diagnostics comprises the step of executing said second predetermined set of diagnostics generally periodically.

22. The method of claim 21 wherein said step of executing said second predetermined set of diagnostics includes the step of determining whether the respective control plane processor element can establish communications with a network device controller.

23. The method of claim 21 wherein said step of executing said second predetermined set of diagnostics includes the step of determining whether any runtime errors have been detected by the respective control plane processor element within the respective period.

24. The method of claim 21 wherein said step of executing said second predetermined set of diagnostics includes the step of executing said first predetermined set of diagnostics.

25. A telecommunications system comprising:

a network;

a plurality of apparatus in communication with the network, each apparatus for configuring a control plane in a network device having at least one line card for receiving and transmitting data, said at least one line card being communicably coupled to at least one switch fabric via at least one data path, said apparatus comprising:

first and second control plane processor elements, each operative to generate at least one status signal indicative of the operational status of the respective processor element; first and second control paths associated with said first and second control plane processor elements respectively and communicably coupling said first and second control plane processor elements respectively to said at least one line card, said first and second control paths being isolated from said at least one data path;

selection logic operative in response to said at least one status signal from said first and second control plane processor elements for generating at least one identification signal for identifying one of said first and second control plane processor elements as an Master control plane processor and for communicating said at least one identification signal to said first and second control plane processor elements;

one of said first and second control plane processor elements being operative in response to receipt of said at least one identification signal to configure itself as said active control plane processor element; and said active control plane processor element being operative to transmit configuration information over the associated control path to said at least one line card.

* * * * *